(12) United States Patent
Niemi et al.

(10) Patent No.: US 8,457,427 B2
(45) Date of Patent: Jun. 4, 2013

(54) DIGITAL INFORMATION EXTRACTION (75) Inventors: Sami Niemi, Skanör (SE); Johan Sten, Malmö (SE)

(73) Assignee: Mobile Imaging in Sweden AB, Lund (SE)

( * ) Notice: Subject to any disclaimer, the term of this patent is extended or adjusted under 35 U.S.C. 154(b) by 557 days.

(21) Appl. No.: 12/641,621

(22) Filed: Dec. 18, 2009

(65) Prior Publication Data

US 2010/0189370 A1 Jul. 29, 2010

(30) Foreign Application Priority Data

Dec. 23, 2008 (SE) ....................... 0802657

(51) Int. Cl.
*G06K 9/34* (2006.01)
*G06K 9/46* (2006.01)
(52) U.S. Cl.
USPC ............................ 382/246; 382/173; 382/248
(58) Field of Classification Search
USPC .......................... 382/173, 246, 248
See application file for complete search history.

(56) References Cited

U.S. PATENT DOCUMENTS

| 5,327,248 | A | 7/1994 | Miller et al. |
| 6,246,801 | B1 | 6/2001 | Boyce et al. |
| 6,934,417 | B2 * | 8/2005 | Easwar et al. ............... 382/235 |
| 6,941,019 | B1 | 9/2005 | Mitchell et al. |
| 7,830,409 | B2 * | 11/2010 | Hwang et al. ............. 348/14.13 |
| 2002/0118390 | A1 * | 8/2002 | Easwar et al. ............. 358/1.18 |
| 2008/0199092 | A1 | 8/2008 | Ishida et al. |

FOREIGN PATENT DOCUMENTS

| EP | 1981283 A1 | 10/2008 |
| WO | 2008065249 A1 | 6/2008 |

* cited by examiner

*Primary Examiner* — Bhavesh Mehta
*Assistant Examiner* — Utpal Shah
(74) *Attorney, Agent, or Firm* — Alston & Bird LLP (57) ABSTRACT

There is provided a method for processing a variable length code encoded image having a plurality of scan lines, wherein each scan line has a number of original code blocks including a differentially encoded parameter. The method includes defining a subarea of the image having parts of a number of the scan lines, extracting the subarea, generating a set of auxiliary code blocks having an auxiliary differentially encoded parameter based on the first differentially encoded parameter of a first code block of a first current scan line in the subarea, and associating the auxiliary code blocks with the subarea. There is also provided an apparatus and a computer program product thereof.

18 Claims, 6 Drawing Sheets

DIGITAL INFORMATION EXTRACTION

TECHNICAL FIELD OF THE INVENTION

The present invention relates to the field of digital image processing, and more particularly to a method for processing a variable length code encoded image. There is also provided an apparatus and a computer program product thereof.

BACKGROUND OF THE INVENTION

Digital image processing, such as compression, transmission, browsing and communications is common in the art. Typically early methods of digital image transmission and storage used so-called Pulse Code Modulation (PCM). More recent systems use more complicated digital compression techniques.

Digital compression techniques according to the state of the art are based on transform coding. One such compression technique is the JPEG format as standardized by the Joint Photographic Experts Group according to the standards ITU-T T.81, ISO/IEC IS 10918-1and ITU-T T.84, see inter alia "The JPEG Handbook", by W. Pennebaker, J. Mitchell, Van Nostrand Reinhold, 1993.

It is also common to post-process compressed images. Post-processing may involve applying filters, changing the image format, etc. Post-processing may also involve scaling the compressed image to fit a small screen, and then zooming and panning the scaled image. One product for post-processing compressed images is the PhotoShop software suite provided by Adobe Systems Incorporated of USA.

SUMMARY OF THE INVENTION

Although methods, apparatuses and computer program products according to the state of the art are capable of providing advanced digital image processing functionalities, there is still a need for improved image processing. There is a particular need for improved image processing in devices having scarce computational resources. The term improved image processing may in this context be interpreted as any one of faster, more cost-effective, less computational intensive, and/or more application optimized image processing.

The inventors of the present invention have discovered that there exists a problem when a subarea is to be extracted from a processed image. A subarea may be defined as a selection of blocks. The inventors of the present invention have discovered that there exists a particular problem when a subarea is to be extracted from a compressed image. The inventors of the present invention have discovered that there exists a particular problem when a subarea is to be extracted from an image which has been compressed with a variable length code (hereinafter VLC).

In view of the above, an objective of the invention is to solve or at least reduce the problems discussed above.

It is thus an object of the present invention to provide improved means for processing a digital image. It is a further object of the present invention to provide improved means for extracting a subarea from a processed image. It is a further object of the present invention to provide improved means for extracting a subarea from a compressed image. It is a further object of the present invention to provide improved means for extracting a subarea from an image which has been compressed with a VLC.

Generally, the above objectives are achieved by the attached independent patent claims.

According to a first aspect, the present invention is realized by a method for processing a VLC encoded image. There is thus disclosed a method for processing a variable length code encoded image comprising a plurality of scan lines, each scan line comprising a number of original code blocks comprising a differentially encoded parameter, the method comprising: defining a subarea of the image comprising parts of a number of the scan lines; extracting the subarea; generating a set of auxiliary code blocks, wherein a first of the auxiliary code blocks comprises an auxiliary parameter based on the differentially encoded parameter of a first code block of a first scan line in the subarea, wherein a second of the auxiliary code blocks comprises an auxiliary differentially encoded parameter based on the differentially encoded parameter in a last code block of the first scan line in said subarea; and associating the set of auxiliary code blocks with the subarea.

The disclosed method may thus enable improved image processing. An advantage is that the disclosed subject matter provides an improved method for extracting a subarea from an image which has been compressed with a VLC.

One advantage is that by utilizing the disclosed method re-encoding of the entire subarea may be avoided.

Another advantage is that by utilizing the disclosed method decoding of the entire image may be avoided. Decoding of the entire image may be avoided by utilizing auxiliary information, such as information pertaining to the DC coefficients for (each) minimum coded unit in the image.

A further advantage is that by maintaining the alignment from the source data, part of the source data may be copied "as-is". That is, unnecessary bit-shifts and other alignment related problems may be avoided.

The locations of the individual blocks may be found by having an index into their positions in the VLC encoded bit stream.

The present invention may further reduce the required processor power. The present invention may further reduce the required processor run time for performing a subarea extraction and thereby providing better user experience. The second auxiliary differentially encoded parameter may further be based on the differentially encoded parameter of a first code block of a second scan line in the subarea.

The second code block may appear prior to the first code block in a scanning order of the image.

The first code block may be a next code block of a current scan line in the subarea.

The second code block may be a last code block of a previous scan line in the subarea.

For images comprising on only one scan line, the second and the first scan line may be the same scan line. The selected subarea may comprise a combination of multiple areas within the said one scan line.

The image may be stored as a sequence of code words, and the extracting may further comprise extracting complete code words from the sequence of code words.

The code blocks may comprise code words comprising excluded code bits associated with code blocks excluded from the subarea.

The generating may further comprise: generating alignment data relating to a specific code word, wherein the alignment data is based on the number of excluded bits included in the specific code word; and inserting the alignment data in an auxiliary code block associated with the specific code word.

The specific code word may be the first code block of the first scan line. The specific code word may be the first code block of the second scan line. Data bits in the auxiliary code blocks may overwrite the excluded code bits. At least one of first and last data bits in the auxiliary code blocks may overwrite the excluded code bits.

Data bits corresponding to the alignment data may be based on the excluded code bits.

The first and second auxiliary code blocks may be arranged as first code blocks of respective scan lines of the subarea.

The defining may further comprise extending the subarea to include complete code blocks.

Each code block may be a minimum coded unit, MCU.

Each code block may be part of a JPEG encoded image.

The differentially encoded parameter may be a DC coefficient.

The excluded code bits may be associated with at least one of a DC coefficient and an AC coefficient.

According to a second aspect, the present invention is realized by an apparatus for processing a variable length code encoded image.

There is thus disclosed an apparatus comprising circuitry configured to perform image processing according to the above method for processing a variable length code encoded image.

The apparatus may be a computer. The apparatus may me a printer. The apparatus may be a personal digital assistant. The apparatus may be a mobile phone. The apparatus may comprise a JPEG hardware accelerator.

According to a third aspect, the present invention is realized by a computer program product for processing a variable length code encoded image.

There is thus disclosed a computer program product comprising software instructions that when downloaded to a computer is configured to perform image processing according to the above method for processing a variable length code encoded image.

The computer program product may be provided in a computer-readable storage medium.

The second and third aspects may generally have the same features and advantages as the first aspect.

Other objectives, features and advantages of the present invention will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the [element, device, component, means, step, etc]" are to be interpreted openly as referring to at least one instance of the element, device, component, means, step, etc., unless explicitly stated otherwise. The steps of any method disclosed herein do not have to be performed in the exact order disclosed, unless explicitly stated.

BRIEF DESCRIPTION OF THE DRAWINGS

Embodiments of the present invention will now be described in more detail, reference being made to the enclosed drawings, in which:

FIG. 2(*a*) is a schematic illustration of a processed image;

FIG. 2(*b*) is an illustration of a plurality of scan lines;

FIG. 2(*c*) is an illustration of a plurality of code blocks;

FIG. 2(*d*) is an illustration of a VLC encoded image;

FIG. 2(*e*) is an illustration of an extracted subarea;

FIG. 2(*f*) is an illustration of original code blocks and auxiliary code blocks;

FIG. 2(*g*) illustrates a subarea and auxiliary code blocks;

DETAILED DESCRIPTION OF PREFERRED EMBODIMENTS

The present invention will now be described more fully hereinafter with reference to the accompanying drawings, in which certain embodiments are shown. Like numbers refer to like elements throughout. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. For example, for illustrative purposes the present invention is disclosed in a JPEG context. However, the present is also applicable to other standards and formats, mutatis mutandis.

The following definitions and conventions will be used. Firstly, the term code word is used to represent inter alia a byte, a word or a long word (i.e. 8, 16 or 32 bits) or another other sized entity of data. A code parameter may represent VLC encoded data and may be as long as, shorter than, or longer than a code word (i.e. code parameters are not limited by code word boundaries). Excluded code bits are defined as bits not associated with a selected subarea (i.e. excluded bits represent data excluded from the selected subarea).

Figure 1:
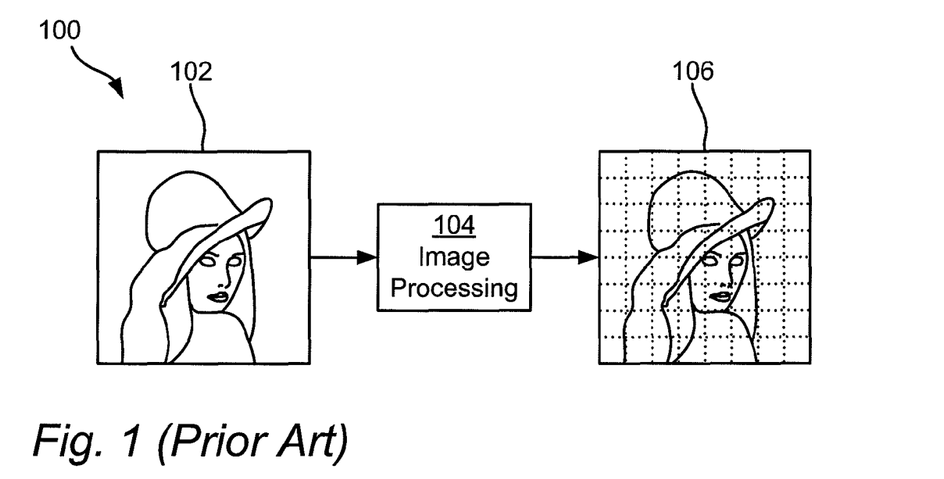
FIG. 1 is a schematic illustration of an image processing system.

FIG. 1 is a schematic illustration of an image processing system 100. The image processing system 100 comprises an original image 102 (or a representation thereof), an image processing unit 104, and a processed image 106 (or a representation thereof). It is assumed that the original image 102 is a digital image, which may have been captured by means of a digital image capturing device, such as a digital camera or a scanner. The original image may also be based on a computer rendering based on mathematical parameters, or a combination of inputs from several sources of image information. Capturing digital images is as such well known in the art and will not be further elaborated upon in this disclosure. The original image comprises a plurality of picture elements, called pixels. Typically the pixels are arranged in vertical columns and horizontal rows of the image.

The image processing unit 104 subjects the original image 102 to image processing by applying one or more image processing algorithms. Such image processing algorithms may include filtration, quantization, compression and the like, see inter alia "Digital Image Processing", by Rafael C. Gonzalez, Richard E. Woods, Prentice Hall, 2008 (3rd Edition). The image processing unit 104 may thus comprise an encoder and a decoder, respectively. The image processing unit may furthermore comprise a storage unit (not shown), wherein the processed image may be stored.

The image processing unit 104 may be implemented as a computer program product comprising one or more software components, or as a dedicated hardware unit for image processing. The software components may comprise software instructions that when downloaded to a computer are configured to perform the instructions associated with the image processing unit. The computer may thus comprise processing means, such as a central processing unit and/or a dedicated image processor, storage means, such as a memory or a computer-readable storage medium, and communication means, such as a receiver and a transmitter and/or a transceiver, inter alia configured to receive input from, and deliver output to, a man-machine interface (MMI), another computer, or the like. The computer may be a stationary computer, a laptop computer, a handheld computer, a mobile communications apparatus, such as a mobile phone, or the like.

According to the JPEG standard, the pixels are grouped together into blocks (MCU) of n×m pixels, where n, m=8, or 16. Each block comprises so-called sublocks which are transformed into code blocks using the discrete cosine transform (DCT). The transform coefficients are then quantized, and ordered according to a zig-zag pattern. The zero-frequency components, corresponding to the mean value of each block, are denoted as DC-coefficients. The rest of the coefficients are denoted as AC-coefficients. The AC-coefficients are zero run length encoded, wherein the non-zero coefficients are encoded with a VLC, such as a Huffman code or an Arithmetic code. Since the DC-coefficients for most photographic pictures are indicative of the presence of correlation from block to block, the DC-coefficient are differentially encoded and/or quantized by using inter alia differential pulse code modulation (DPCM). The encoded blocks are scanned row-by-row, column-by-column, according to a zig-zag pattern, according to a Peano-Hilbert curve, or the like. A sequence of scanned blocks may be denoted as a scan line. Depending on the scanning algorithm a scan line may inter alia represent a block column or block row in the image. The transform coefficients are then quantized and run length encoded, and the result is then encoded with a VLC, such as a Huffman code or an Arithmetic code. Also the coefficient of each block may be scanned using one of the above-mentioned scanning techniques. The resulting bit stream may then be transmitted or stored.

A decoder may perform the inverse operations of the encoder in order to generate a decoded or processed image 106. That is, the decoder may inter alia perform variable length decoding, run length decoding, inverse quantization and inverse discrete cosine transform.

Figure 2A:
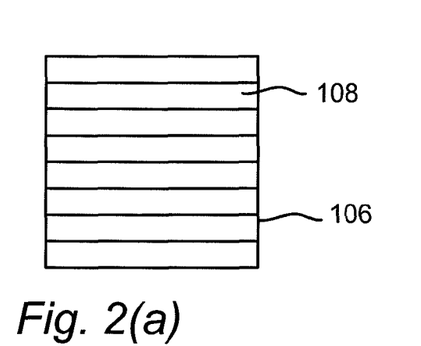

FIG. 2(a) is a schematic illustration of a processed image 106 comprising a plurality of scan lines 108. As stated above the orientation of the scan lines depends on the scanning algorithm utilized. In FIG. 2(a) the scanning lines are horizontal, which may be the result of a row-by-row scan.

Figure 2B:
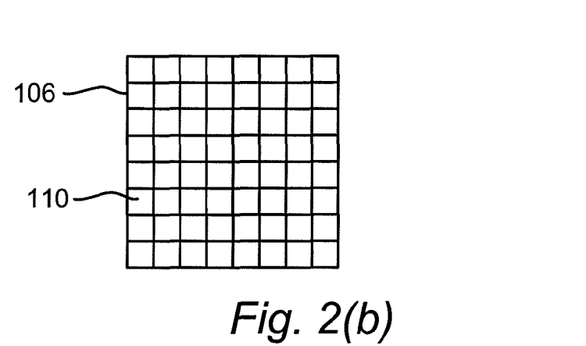

FIG. 2(b) is an illustration of a plurality of scan lines 106 comprising original code blocks 110. As illustrated in FIG. 2(b) each scan line 106 comprises a number of original code blocks 110. The term "original code blocks" is here used to denote that the code blocks 110 may have been generated using a standard image processing algorithm, such as the JPEG algorithm.

Figure 2C:
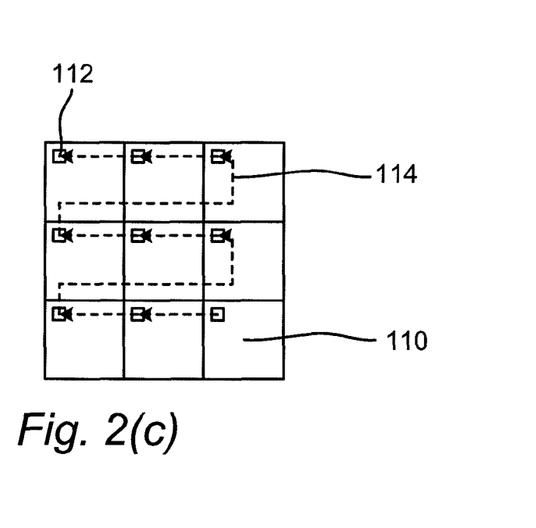

FIG. 2(c) is an illustration of a plurality of code blocks 110 arranged in an array of three rows and three columns. As illustrated in FIG. 2(c) the original code blocks 110 comprise a differentially encoded parameter, one of which is schematically illustrated by the reference numeral 112. The dependency from block to block is illustrated by the arrows 114. That is, according to an embodiment the differentially encoded parameter of the first block of row k is dependent on the differentially encoded parameter of the last block of row k-1. The first block of the scanned sequence of blocks may not comprise a parameter which is dependent on a parameter of another block. The first block is usually defined to be dependent on zero DC coefficients. Furthermore, there may be additional dependencies between sublocks within the block, which are not illustrated here.

Figure 2D:
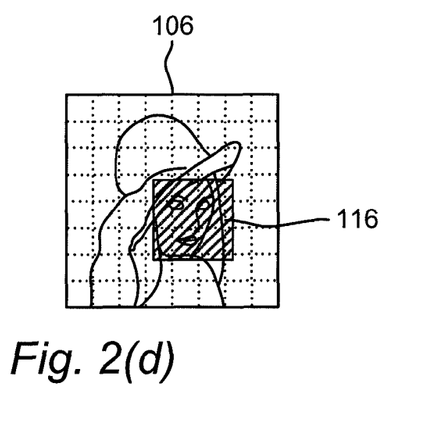
Figure 9:
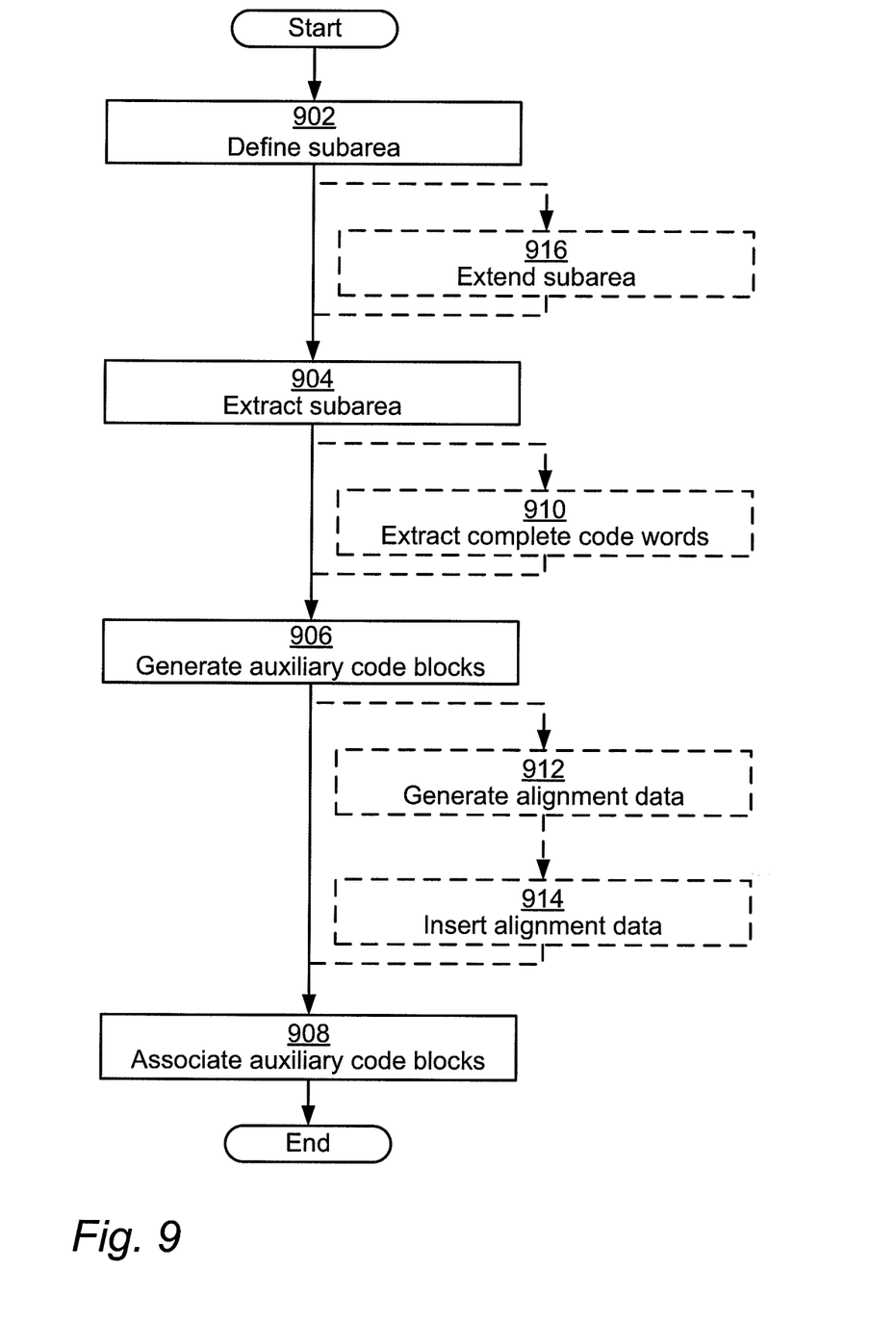
FIG. 9 is a flowchart of methods according to embodiments.

A method for processing a VLC encoded image will be described next inter alia with reference to the flowchart of FIG. 9. The method comprises in a step 902 defining a subarea of the image comprising parts of a number of said scan lines. As noted above the term subarea is in general terms used to define a selection of blocks. This selection of blocks may define a non-rectangular subarea, or several subareas for one scan line. FIG. 2(d) is an illustration of a VLC encoded image 106, wherein a subarea 116 has been defined as illustrated by the shaded area.

Figure 2E:
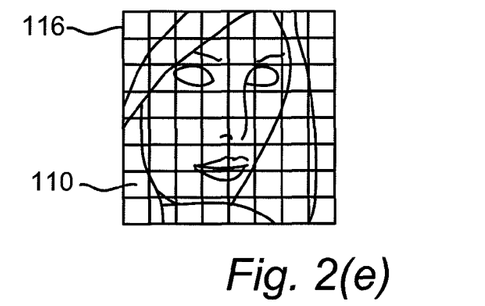

The method comprises in a step 904 extracting the subarea 116. FIG. 2(e) is an illustration of an extracted subarea 116 comprising a number of original code blocks 110.

Figure 2F:
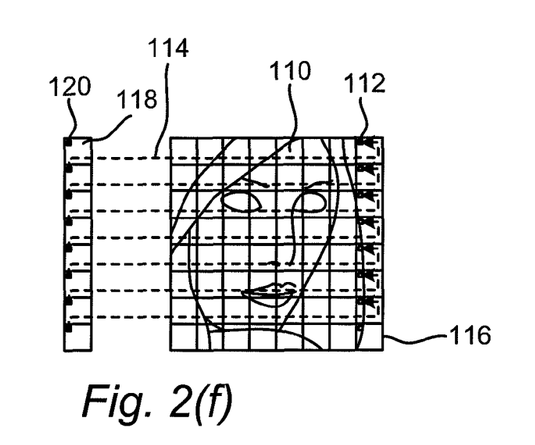

The method comprises in a step 906 generating a set of auxiliary code blocks. FIG. 2(f) illustrates a number of original code blocks 110 of a subarea 116 and a set of auxiliary code blocks 118. The original code blocks 110 comprise a differentially encoded parameter 112. The auxiliary code blocks 118 comprise an auxiliary differentially encoded parameter 120. The auxiliary differentially encoded parameter 120 is based on the differentially encoded parameter 112 of a first code block of a first scan line in the subarea 116, as illustrated by the arrows and dashed lines 114. The auxiliary differentially encoded parameter may further be based on the differentially encoded parameter 112 of a second code block of a second scan line in the subarea 116. The second code block may appear prior to the first code block along a scanning direction of the image. The first code block may be a next code block of a current scan line in the subarea. The second code block may be a last code block of a previous scan line in the subarea.

Figure 2G:
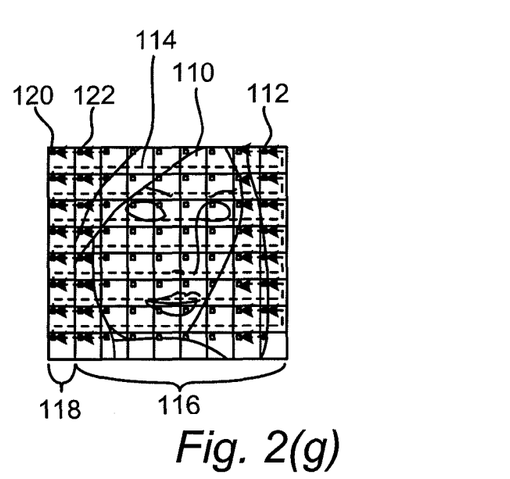

The method comprises in a step 908 associating the auxiliary code blocks with the subarea. FIG. 2(g) illustrates a subarea 116 associated with the auxiliary code blocks 118. In each scan line of the subarea 116 the differentially encoded parameter 122 of the left-most original code blocks has been associated with a corresponding auxiliary code block. The association between original code blocks 110 and auxiliary code blocks 118 may be such that the auxiliary differentially encoded parameter 120 depends on the differentially encoded parameter 122.

In this illustrative example each one of the left-most original code blocks has been associated with a corresponding auxiliary code block since it is assumed that in each scan line 108 the original blocks 110 have been scanned from left to right. Thus in general the particular association between original code blocks 110 and auxiliary code blocks 118 may depend on the scanning technique (i.e. in which order the original blocks 110 have been scanned in each scan line 108 and/or how the scan lines 108 have been defined).

The particular association between original code blocks 110 and auxiliary code blocks 118 may also be independent of the scanning technique. For example, the auxiliary block may be associated with the subarea from the right although the scanning order is from left to right. In such a case there may be alignment problems. However, such alignment problems may be solved by introducing an auxiliary scan line before (i.e. "above") the first scan line of the subarea.

Hence, the auxiliary block may be associated with the subarea from the left or from the right as a column of blocks, or from the top or from the bottom as a row of blocks, mutatis mutandis.

Each code block may be a minimum coded unit (MCU). The MCU may comprise at least one luminance component. and the MCU may further comprise at least two chrominance components. Preferably the MCU comprises two luminance components, hereinafter denoted Y1 and Y2. Preferably the MCU comprises two chrominance components, hereinafter denoted U and V. Each code block may be part of a JPEG encoded image.

In order to generate a new JPEG image by cropping an original JPEG image an alternative solution may involve decoding the VLC encoded blocks for every block in the image, and then for each block within the selected cropped area re-encoding the VLC decoded data into a new JPEG image. This may be a faster approach than decoding the entire JPEG image into pixels, as only the VLC encoded data needs to be decoded, i.e. no forward DCT or inverse DCT have to be performed.

Figure 3:
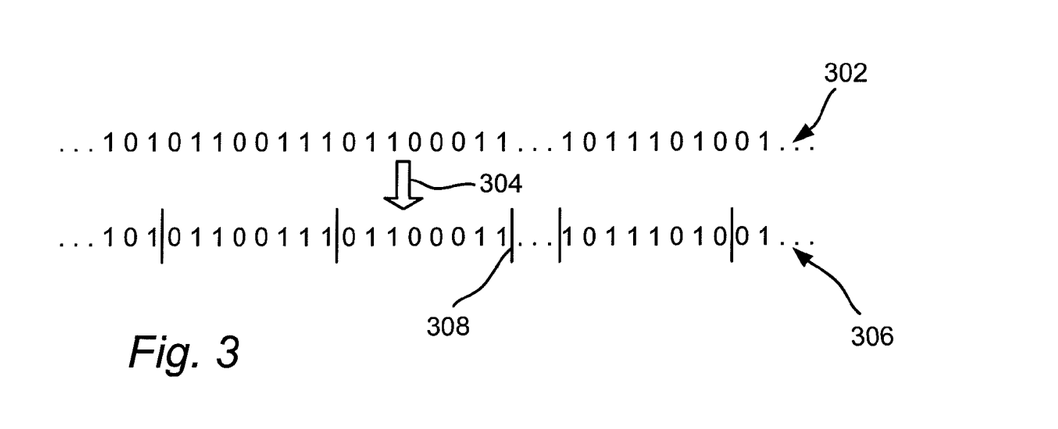
FIG. 3 illustrates sequences of code words.

The image 106 may be stored as a sequence of code words. The code words may be binary, hexadecimal, or the like. According to an embodiment the method may comprise in a step 910 extracting complete code words from the sequence of code words. FIG. 3 illustrates a sequence 302 of code words. An arrow 304 schematically illustrates an extraction process wherein complete code words are extracted from the sequence 302 of code words. Reference numeral 306 refers to an extracted sequence of complete code words (i.e. a code word comprising only bits of the selected subarea), wherein the code words have been separated, as illustrated by the vertical lines 308.

Figure 4:
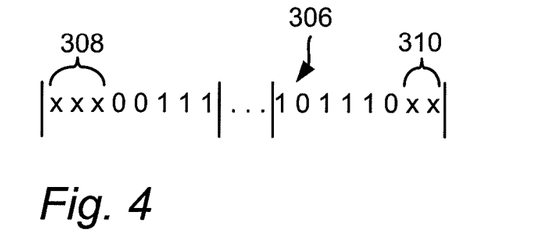
FIG. 4 illustrates sequences of code words.

Since the image has been encoded with a VLC each code parameter may be associated with more than one code word or, if the code parameter is smaller than the size of a code word, with a portion of a code word. In other words, each code parameter may be associated with more than one complete code word. Similarly each code word may be associated with more than one code parameter. That is, as a consequence the complete code words may comprise so-called excluded code bits associated with code blocks not defining the extracted subarea. FIG. 4 illustrates a sequence 306 of complete code words, wherein the leftmost complete code word comprises code bits x xx denoted by the reference numeral 308 which code bits are not associated with the extracted subarea. Similarly the rightmost complete codeword comprises excluded code bits xx denoted by the reference numeral 310.

The auxiliary code blocks may be encoded with a VLC. Thus a given parameter in a first auxiliary code block may be encoded with a first number of bits whilst the same given parameter in a second auxiliary code block may be encoded with a second number of bits different from the first number of bits. Similarly, the auxiliary differentially encoded parameters of the auxiliary code blocks may be encoded with a VLC. Thus the encoded parameters of the auxiliary code blocks may include code words including data excluded from the desired image. Hence the code words may be associated with alignment data. According to an embodiment the method may comprise in a step 912 generating alignment data relating to one or more specific code words. Alignment may be towards both previous and next code words. The specific code word may be a code word of a code block of the subarea.

Figure 5:
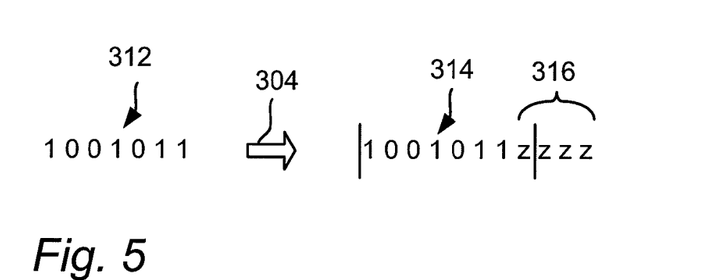
FIG. 5 illustrates sequences of code words.

FIG. 5 illustrates auxiliary data bits 312 inter alia representing an auxiliary differentially encoded parameter. In the illustrative example of FIG. 5 the auxiliary data bits 312 comprises seven bits, whereas it is assumed that each complete code word comprises a total of eight bits. As schematically illustrated by the arrow 304 the auxiliary data bits 312 is associated with alignment data resulting in the expanded code word 314 comprising the seven original bits and alignment bits zzzz denoted by the reference numeral 316. The alignment data, or bits, may be based on the number of excluded bits included in the specific code word, as will be further explained below.

Figure 6:
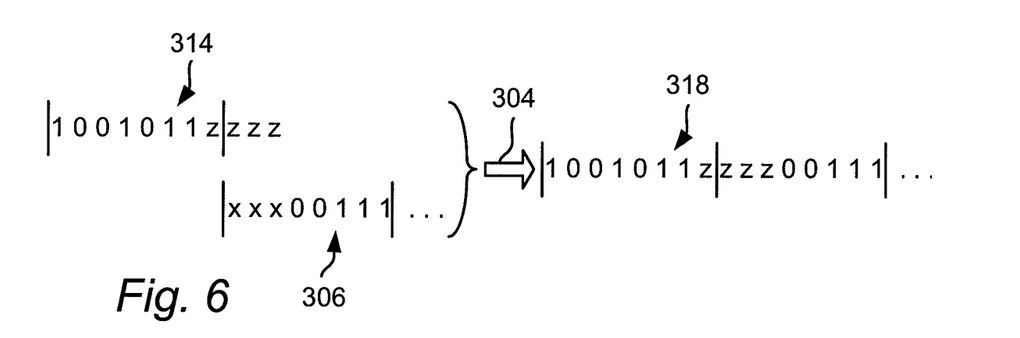
FIG. 6 illustrates sequences of code words.

According to an embodiment the method may comprise in a step 914 inserting the alignment data in an auxiliary code block associated with the specific code word. FIG. 6 illustrates an expanded code word 314 of an auxiliary code block, wherein the expanded code word comprises alignment bits zzzz, and a complete code word 318 associated with a code block of a subarea.

Data bits in the auxiliary code blocks may be used to overwrite the excluded code bits. This may be accomplished by evaluating the requirements for alignment bits on code blocks adjacent to the auxiliary code blocks and generating the auxiliary code block based inter alia on the condition that the auxiliary code blocks have lengths of n*8+#alignment bits, wherein n is an integer and #alignment bits is the number of alignment bits needed to keep the alignment of the bits in the complete code words after insertion of the auxiliary data block in between a first and a second code block.

This type of auxiliary code block may have the following format:

<DC diff Y1> <EOB>
<DC diff Y2> <EOB>
<DC diff U> <EOB>
<DC diff V>
<AC align> <EOB>, wherein DC diff Y1 represents the differential encoded DC coefficient for the first luminance component Y1, DC diff Y2 represents the differential encoded DC coefficient for the second luminance component Y2, DC diff U represents the differential encoded DC coefficient for the first chrominance component U, DC diff V represents the differential encoded DC coefficient for the second chrominance component V, EOB denotes end of block, and AC align denotes the alignment coefficients to be generated. In general, the alignment coefficient may be any coefficient, not necessary the denoted AC coefficient.

In order to find suitable AC coefficients a table of eight desired alignments (i.e. 0-7 bits, in a case of 8 bit code words), from which table the desired AC coefficients may be chosen. In case the original image has been JPEG encoded using standard Huffman tables the following table for the U and V components could be used:

(0: no AC coefficient added)
1: symbol 0x04 with code 11000000 0
2: symbol 0x05 with code 11001000 00
3: symbol 0x01 with code 010
4: symbol 0x52 with code 11111110 0100
5: symbol 0x02 with code 10000
6: symbol 0x26 with code 11111111 10001100 000000
7: symbol 0x03 with code 1010000

As an example, assume that the format <DC diff Y1><EOB><DC diff Y2><EOB><DC diff U><EOB><DC diff V><AC align><EOB> is to be used and takes the following values (wherein the desired total alignment is +4):

<010><1010><00><1010><00><00><011><?><00>, wherein <?> represents the alignment bits to be determined. Hence, not taking the bits of the alignment AC coefficients into account the sequence comprises a total of 22 bits. The 22 bits are aligned with 6 bits (<bbbbbbbb bbbbbbbb bbbbbb>), requiring the AC coefficient to be aligned with additional n*8+6 bits in order to become aligned with 4 bits (ex. <bbbbbbbb bbbbbbbb bbbbbbaa aaaa>), wherein n is an integer. Thus the coefficient <11111111 10001100

000000>may be chosen from the above table, thereby generating inter alia the following auxiliary code block:

<01010100 01010000 00111111 11111000 11000000 0000>.

Thus the auxiliary code block has an alignment of four, and also comprises the desired differential DC values. The auxiliary code block may be inserted between the first and the second MCU, without affecting the alignment of the bits in relation to the boundaries of the next code words.

Figure 7:
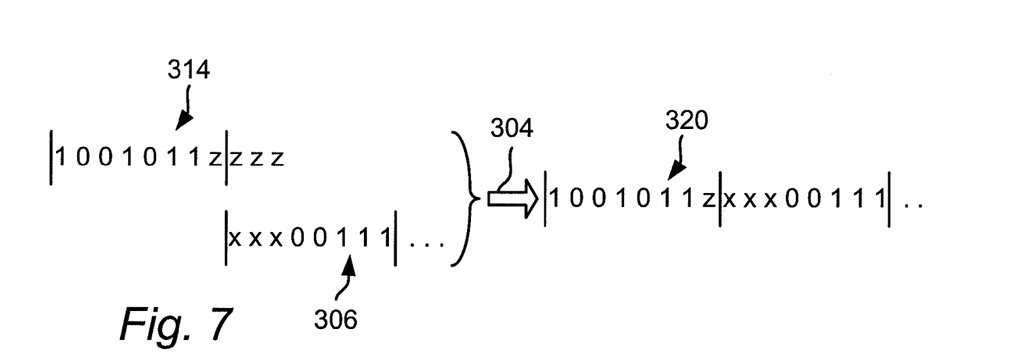
FIG. 7 illustrates sequences of code words.

FIG. 7 illustrates an expanded code word 314 of an auxiliary code block, wherein the expanded code word comprises alignment bits zzzz, and a complete code word 320 associated with a code block of a subarea.

Data bits corresponding to the alignment data may be based on the excluded code bits. This may be accomplished by evaluating the requirements for alignment bits on code blocks adjacent to the auxiliary code blocks and generating the auxiliary code block based inter alia on the condition that the auxiliary code blocks have lengths of n*8+# alignment bits, wherein n is an integer and # alignment bits is the number of alignment bits needed to keep the alignment of the bits in the complete code words after insertion of the auxiliary data block in between a first and a second code block and wherein the alignment bits are pre-determined. In this case the last coefficient of the auxiliary code block is set to a non-zero value. This value is then encoded using a AC JPEG category, wherein the AC JPEG category determines the required number of least significant bits (LSBs). The AC JPEG category is chosen to be larger or equal to the needed alignment. In order to generate the correct number of bits (and the correct number of coefficients) additional AC coefficients <AC coeff> are then inserted between <DC diff V> and the final AC coefficient <Final AC coeff>.

This type of auxiliary code block may have the following format:

| |
|---|
| <DC diff Y1> <EOB> |
| <DC diff Y2> <EOB> |
| <DC diff U> <EOB> |
| <DC diff V> |
| n* <AC coeff> |
| <Final AC coeff>, | wherein n is an integer.

The auxiliary code blocks may be arranged as first code blocks of scan lines of the subarea.

Figure 8:
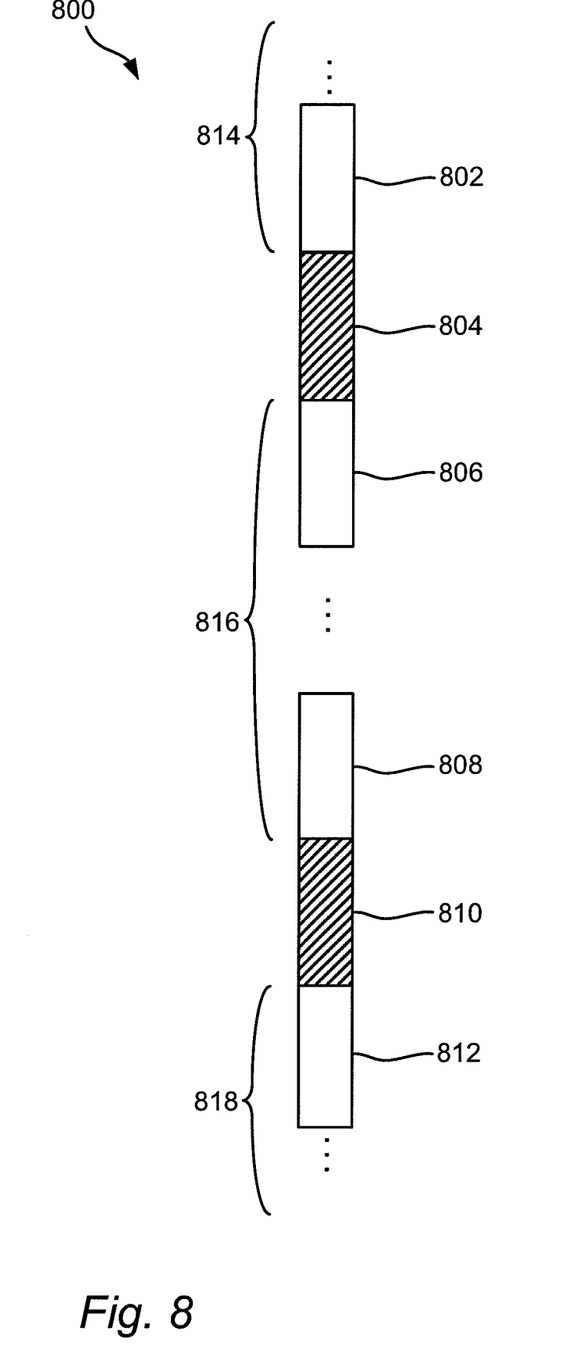
FIG. 8 illustrates a sequence of code words.

FIG. 8 illustrates a sequence of code words 800 wherein auxiliary code blocks 804, 810 have been inserted between the last code block 802 of a previous code block 814, 816 and the first code block 806, 812 of a next code block 818, 818 (that is, note that code block 816 acts as both a previous code block and a next code block).

According to an embodiment the method may comprise in a step 916 extending the subarea to include complete code blocks.

The differentially encoded parameter may be a DC coefficient. The excluded code bits may be associated with any coefficients, such as either DC coefficients or AC coefficients.

As explained above an MCU may comprise luminance and chrominance components. Some of the components may be subsampled in horizontal and/or vertical direction. A common format is denoted as YUV422, wherein the second (U) and third (V) components have been horizontally subsampled, thus requiring two first components (Y), as it has to have twice the horizontal data. In other words the MCU for the YUV422 format may be symbolically written as [MCU YUV422]=[[Y1][Y2][U][V]]. Each component has a DC coefficient. The component's DC coefficient may be dependent on the previous DC component. In case of the U and V components they may be dependent on the previous MCU's U and V components, respectively. Y1 may be dependent on a previous MCU's Y2 component. Y2 may be dependent on Y1 in the same component.

When, in this particular embodiment, referring to dependencies of the DC components to previous MCUs, it should be understood that only the Y1 component is dependent on the previous MCU's Y1 component, as the Y2 components may be dependent on the previous Y1 component in the same MCU.

Below is an example of a set of MCUs in an image utilizing the YUV422 format, wherein the image comprises 16 times 8 MCUs, each comprising four data units of 8 pixels by 8 pixels. In this example the image comprises 160 MCUs per MCU scan line:

. . .
. . . [MCU 200] [MCU 201] [MCU 202] [MCU 203] . . .
. . . [MCU 360] [MCU 361] [MCU 362] [MCU 363] . . .
. . . [MCU 520] [MCU 521] [MCU 522] [MCU 523] . . .
. . . [MCU 680] [MCU 681] [MCU 682] [MCU 683] . . .
. . .

Assume that MCU 361, MCU 362, MCU 521, and MCU 522 are to be extracted into a new image. Since, for example, the Y1 DC-coefficient of MCU 361 is dependent on the Y1 DC-coefficient of MCU360 auxiliary blocks, hereinafter denoted DMCUs, are generated in order to solve the DC dependency. The DMCUs may further enable keeping the same byte alignment for all the bits for all the MCUs; a bad alignment may be a problem for copying, as the input then has to be bit shifted, as explained above. It may also be a problem for so-called escape handling, as the JPEG standard requires the data 0x00 to be inserted after each data 0xff in the bit stream. A change of bit alignment may change the location of the 0xff data, thus requiring rather slow handling of escapes (i.e. corresponding to the data 0xff). By insertion of the DMCUs the original bit alignment for the complete data may be preserved. By insertion of the DMCUs the DC dependency problem may be solved.

Thus for the above example the new image will comprise blocks according to the below, wherein DMCU 0 and DMCU1 are the added auxiliary MCU blocks:

[DMCU 0] [MCU 361] [MCU 362]
[DMCU 1] [MCU 521] [MCU 522]

Hence, the new (and smaller) image will contain a first MCU column of "non image data". However, this non image data may be removed or ignored once decoded.

To further exemplify the process of alignment, the byte alignment of each MCU data is illustrated below. The aaa . . . aa sequence refers to the bits of MCU 360, the bbb . . . bb refers to the bits of MCU361, and so on. Thus, assume that MCU 361, MCU 362, MCU 363, MCU 521, and MCU 522 have data and alignment in terms of whole blocks illustrated below:

MCU 361=[aaaabbbb bbbbbbbb . . . bbbbbccc], left alignment +4, right alignment −3;

MCU 362=[bbbbbccc cccccccc . . . ccdddddd], left alignment +5, right alignment −6;

MCU 521=[fggggggg gggggggg . . . gghhhhhh], left alignment +1, right alignment −6; and MCU 522=[gghhhhhh hhhhhhhh . . . hhiiiiii], left alignment +2, right alignment −6.

DMCU 0 should have a correct byte alignment according to MCU361, i.e. +4. In other words, for blocks of one byte (i.e. 8 bits) the bit length of the DMCU 0 should be n*8+4, where n is an integer. Also, the DC coefficients of the DMCU 0 should add up to zero together with the DC coefficients of the MCU 361. A sufficient DMCU 0 may thus be:

DMCU 0=[xxxxxxx xxxyyyyy yyyyyyyy yyyybbbb], wherein xxx . . . xx may be calculated according to the DC value of the MCU 361, and the sequence yyy . . . yy is any sequence of valid codewords or least significant bits (LSBs) including end of block (EOB) data. The bits of the last byte [yyyy . . . ] may be joined with the bits of the next MCU [. . . bbbb] into [yyyybbbb].

DMCU 1 should have a correct byte alignment according to MCU521, and MCU 362, i.e. −3 towards MCU 361, and +1 towards MCU 521. A sufficient DMCU 1 may thus be:

DMCU 1=[ccxxxxxx xxxxxxyy yyyyyyyy yyyyyyyy yggggggg], wherein the bits of the last byte [y . . . . . . ] may be joined with the bits of the next MCU [. ggggggg] into [yggggggg]. The bits of the first byte [. . . xxxxxx] may be joined with the bits of the previous MCU [cc . . . . . . ] into [ccxxxxxx].

Alternate DMCUs without EOB in the last DMCU may also be generated. For example, the last coefficient's last bits may comprise LSBs generated in order to consume unwanted bits remaining from the previous MCU in the first byte of the MCU after the DMCU. In this case it may not be necessary to join the bits of the DMCU and the subsequent MCU; the DMCU's last bits may be LSBs and, as such, be of arbitrary nature.

There is provided a method for processing a VLC encoded information sequence comprising a plurality of original code blocks comprising a differentially encoded parameter, wherein the method comprises: defining at least one subsequence of the VLC encoded information sequence, each subsequence comprising parts of a number of the plurality of original code blocks, extracting the at least one subsequence, generating a set of auxiliary code blocks comprising an auxiliary differentially encoded parameter based on said differentially encoded parameter of a first code block of the parts of the number of the plurality of original code blocks in the subsequence, and associating the auxiliary code blocks with the subsequence.

The auxiliary differentially encoded parameter may be based on the differentially encoded parameter of a second code block of a second code block of the parts of the number of the plurality of original code blocks in the subsequence.

The step of generating may further comprise: generating alignment data relating to a specific code word, wherein the alignment data is based on a number of excluded bits included in the specific code word; and inserting the alignment data in an auxiliary code block associated with the specific code word.

There is disclosed a method for processing a variable length code encoded image comprising a plurality of scan lines, each scan line comprising a number of original code blocks comprising a differentially encoded parameter. The method comprises defining a subarea of the image comprising parts of a number of the scan lines, extracting the subarea, and adapting the differentially encoded parameter of a second code block of a second scan line in the subarea to the differentially encoded parameter of a first code block of a first scan line in the subarea. The second code block may appear prior to the first code block in a scanning order of the image. The first code block may be a next code block of a current scan line in the subarea. The second code block may be a last code block of a previous scan line in the subarea.

The method may further comprise generating a set of auxiliary code blocks comprising an auxiliary parameter.

The auxiliary parameter may take a static value. The auxiliary parameter may take the value zero. Thus the value of the auxiliary parameter may be pre-determined and hence be independent of data in the first code block and the second code block.

The method may further comprise determining a misalignment between the second code block and the first code block. Misalignment between code blocks has been explained above. The misalignment may relate to the code words of the second code block and the first code block, respectively.

Misalignment problems may cause parts of the code blocks to be difficult, or even impossible, to decode. Thus the method may further comprise generating alignment bits based on the determined misalignment.

The method may further comprise inserting the generated alignment bits in the auxiliary code blocks. Thus the auxiliary code blocks may comprise the auxiliary parameter and the alignment bits. The auxiliary code blocks may therefore have the same format as the original code blocks.

The method may further comprise associating the auxiliary code blocks with the subarea. Thus the bits of the code blocks of the extracted subarea and the bits of the auxiliary code blocks may form a single bit stream. Furthermore, since the auxiliary code blocks may have the same format as the original code blocks this single bit stream may be easy to process, decode, and the like.

There is also provided a method comprising performing a selection of blocks from VLC stream of blocks, generating a new VLC stream of blocks by using the selected blocks, and generating at least one auxiliary block in the new VLC stream of blocks. The size of the VLC auxiliary block may be arranged such that it does not change the bit alignment of subsequent block(s) copied from the original VLC stream. The auxiliary block may be arranged to adjust dependency of previous and/or next block(s).

There is also provided a method comprising performing a selection of blocks is from a VLC encoded stream of blocks, wherein the blocks have a dependency on previous block(s), generating a new variable length encoded stream of blocks by using the selected blocks, and for each block that has an original dependency on a non-previous block in the new stream of blocks, generating an auxiliary block is arranged to be between the previous block with an adjusted dependency and a next block, wherein the size of the auxiliary block is arranged such that it keeps the bit alignment of subsequent block(s).

The above methods may be applicable to encoded digital information, such as encoded digital image information, encoded digital music information, encoded digital text information, and encoded correlated data information. The encoded digital information may be encoded compressed digital information.

Figure 10:
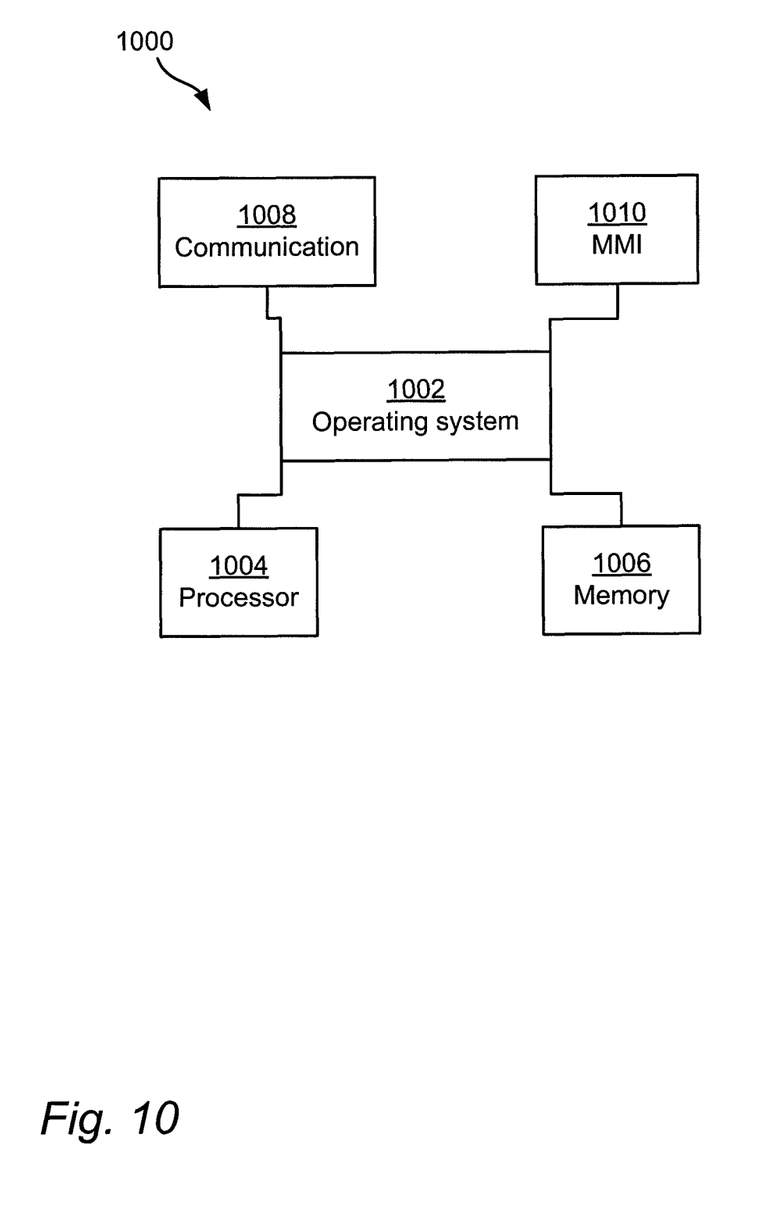
FIG. 10 is a schematic illustration of an apparatus.

The above disclosed computer may comprise circuitry configured to perform a method according to the above. Alternatively, circuitry configured to perform a method according to the above may be arranged in a separate computer which may be connectable to one of the above disclosed computers. FIG. 10 is a schematic illustration of an apparatus 1000 according to an embodiment. The apparatus 1000 may be a computer. The apparatus 1000 may be a personal digital assistant (PDA). The apparatus 1000 may be a mobile phone. The apparatus 1000 comprises processing means 1004, such as a central processing unit and/or a dedicated image processor, such as a JPEG hardware accelerator, storage means 1006, such as a memory or a computer-readable storage medium, and communication means 1008, such as a receiver and a transmitter and/or a transceiver, inter alia configured to receive input from, and deliver output to, a man-machine interface (MMI) 1010, another computer, or the like. The apparatus 1000 is run under supervision of a operating system 1002.

The above disclosed computer program product may comprise software instructions that when downloaded to a computer, such as the apparatus 1000, are configured to perform a method according to the above. Alternatively, the software instructions may be separately distributable to be distributed in a computer network. The computer program product may be provided in a computer-readable storage medium, such as a random access memory (RAM), a read-only memory (ROM), a universal series bus (USB) product, such as a memory stick, or the like.

The invention has mainly been described above with reference to a certain examples. However, as is readily appreciated by a person skilled in the art, other examples than the ones disclosed above are equally possible within the scope of the invention, as defined by the appended patent claims.

The invention claimed is:

1. A method for processing a variable length code encoded image having a plurality of scan lines, each scan line having a number of original code blocks having a differentially encoded parameter, the method comprising:
   defining a subarea of the image having parts of a number of the scan lines; extracting the subarea;
   generating a set of auxiliary code blocks, wherein a first of the auxiliary code blocks having an auxiliary parameter based on the differentially encoded parameter of a first code block of a first scan line in the subarea,
   wherein a second of the auxiliary code blocks having an auxiliary differentially encoded parameter based on the differentially encoded parameter in a last code block of the first scan line in the subarea;
   associating the set of auxiliary code blocks with original code blocks of the subarea;
   wherein the generating further comprises: generating alignment data relating to a specific code word, wherein the alignment data is based on a number of excluded bits included in the specific code word; and inserting the alignment data in an auxiliary code block associated with the specific code word; and
   wherein the specific code word is the first code block of the first scan line.

2. The method according to claim 1, wherein the second auxiliary differentially encoded parameter is further based on the differentially encoded parameter of a first code block of a second scan line in the subarea.

3. The method according to claim 1, wherein the image is stored as a sequence of code words, and wherein the extracting further comprises: extracting complete code words from said sequence of code words.

4. The method according to claim 1, wherein the code blocks have code words having excluded code bits associated with code blocks excluded from the subarea.

5. The method according to claim 1, wherein the image is stored as a sequence of code words, and wherein the extracting further comprises: extracting complete code words from the sequence of code words, wherein data bits corresponding to the alignment data are based on the excluded code bits.

6. The method according to claim 1, wherein the first and second auxiliary code blocks are arranged as first code blocks of respective scan lines of the subarea.

7. The method according to claim 1, wherein the defining further comprises extending the subarea to include complete code blocks.

8. The method according to claim 1, wherein each code block is a minimum coded unit, MCU.

9. The method according to claim 1, wherein each code block is part of a JPEG encoded image.

10. The method according to claim 1, wherein said differentially encoded parameter is a DC coefficient.

11. The method according to claim 1, wherein the excluded code bits are associated with at least one of a DC coefficient and an AC coefficient.

12. An apparatus having circuitry configured to perform a method according to claim 1.

13. A non-transitory computer-readable medium containing instructions that when downloaded to a computer is configured to perform a method according to claim 1.

14. The method according to claim 2, wherein the image is stored as a sequence of code words, and wherein the extracting further comprises: extracting complete code words from said sequence of code words.

15. The method according to claim 2, wherein the code blocks have code words having excluded code bits associated with code blocks excluded from the subarea.

16. A method for processing a variable length code encoded image having a plurality of scan lines, each scan line having a number of original code blocks having a differentially encoded parameter, the method comprising:
   defining a subarea of the image having parts of a number of the scan lines; extracting the subarea;
   generating a set of auxiliary code blocks, wherein a first of the auxiliary code blocks having an auxiliary parameter based on the differentially encoded parameter of a first code block of a first scan line in the subarea,
   wherein a second of the auxiliary code blocks having an auxiliary differentially encoded parameter based on the differentially encoded parameter in a last code block of the first scan line in the subarea;
   associating the set of auxiliary code blocks with original code blocks of the subarea;
   wherein the generating further comprises: generating alignment data relating to a specific code word, wherein the alignment data is based on a number of excluded bits included in the specific code word; and inserting the alignment data in an auxiliary code block associated with the specific code word; and
   wherein the code blocks have code words having excluded code bits associated with code blocks excluded from the subarea, and wherein the specific code word is the first code block of a second scan line.

17. A method for processing a variable length code encoded image having a plurality of scan lines, each scan line having a number of original code blocks having a differentially encoded parameter, the method comprising:
   defining a subarea of the image having parts of a number of the scan lines; extracting the subarea;
   generating a set of auxiliary code blocks, wherein a first of the auxiliary code blocks having an auxiliary parameter based on the differentially encoded parameter of a first code block of a first scan line in the subarea,
   wherein a second of the auxiliary code blocks having an auxiliary differentially encoded parameter based on the differentially encoded parameter in a last code block of the first scan line in the subarea;
   associating the set of auxiliary code blocks with original code blocks of the subarea;
   wherein the generating further comprises: generating alignment data relating to a specific code word, wherein the alignment data is based on a number of excluded bits included in the specific code word; and inserting the alignment data in an auxiliary code block associated with the specific code word; and wherein the code blocks have code words having excluded code bits associated with code blocks excluded from the subarea, and wherein data bits in the auxiliary code blocks overwrite the excluded code bits.

18. The method according to claim 17, wherein at least one of first and last data bits in the auxiliary code blocks overwrite the excluded code bits.

* * * * *